United States Patent [19]

Inui et al.

[11] Patent Number: 5,338,707
[45] Date of Patent: Aug. 16, 1994

[54] PROCESS FOR PRODUCTION OF HIGH-PURITY MULLITES

[76] Inventors: Tomoyuki Inui, 5-43, Utoyama 1-chome, Uji-shi, Kyoto-fu; Masashi Inoue, Kyoto University Shokuin-shukusha 123, Gokashou-kanyuchi, Uji-shi, Kyoto-fu, both of Japan

[21] Appl. No.: 886,551

[22] Filed: May 20, 1992

[30] Foreign Application Priority Data

May 21, 1991 [JP] Japan ................................ 3-145355

[51] Int. Cl.⁵ .............................................. C03C 3/00
[52] U.S. Cl. ..................................... 501/12; 501/128; 501/153
[58] Field of Search ....................... 501/12, 128, 153; 423/625

[56] References Cited

U.S. PATENT DOCUMENTS 5,045,514  9/1991  Ismail et al. ............... 501/119
5,064,783  11/1991  Luckevich .................. 501/12
5,173,455  12/1992  Terbot et al. ............... 501/12

*Primary Examiner*—Mark L. Bell
*Assistant Examiner*—A. Wright
*Attorney, Agent, or Firm*—Panitch Schwarze Jacobs & Nadel

[57] ABSTRACT

A process is disclosed for the production of high purity mullites. The process involves reacting a mixture of aluminum alkoxide and silicon alkoxide with an atomic ratio (weight) of Al/Si in the range of 2-7 in an aromatic hydrocarbon solvent at a temperature of 200°-350° C. and calcining the resulting reaction product at a temperature above 900° C. The mullite product obtained finds wide application as a high temperature service structural material such as for automotive engines and turbines as well as a support for combustion catalyst.

4 Claims, No Drawings

PROCESS FOR PRODUCTION OF HIGH-PURITY MULLITES

BACKGROUND OF THE INVENTION

1. Field of the Invention

This invention relates to a process for the production of high-purity mullites for use as heat-resistant structural materials.

2. Prior Art

Attention has been focused lately on the use of ceramics which have superb high temperature performance characteristics unparalleled with conventional metallic or organic heat-resistant materials.

Ceramics of oxide type are typically silicon nitride and silicon carbide and those of non-oxide type are typically alumina and zirconia. Even these ceramics materials are evaluated to be not entirely satisfactory to combat such extremely high temperature industrial applications as are and will be demanded by the ever growing high technology of today. For instance, when taking into account a temperature-dependent flexural strength, silicon nitride, silicon carbide and alumina have manageable critical temperatures of up to 1,200° C., 1,300° C. and 1,000° C., respectively. However, there are in fact many fields of application where structural materials are exposed to much higher temperatures than just indicated. With this background in view, mullites come to the fore which are reputed for strong covalent linkage and improved temperature-dependent characteristics related to mechanical strength. Mullites are one of the well-known aluminosilicate minerals generally represented as $3Al_2O_3 \cdot 2SiO_2—2Al_2O_3 \cdot SiO_2$, and usually in a spicular form found in porcelain and refractory manufactured from naturally occuring clay minerals. Typical processes for making the mullites include a sol-gel process in which alumina sol and silica gel are homogeneously mixed, the resulting mixture being adjusted in pH, dehydrated, gelled and finally calcined; a co-precipitation process in which a mixture of aqueous aluminum salt and silica sol is neutralized with aqueous ammonium, the resulting co-precipitate being filtered, washed, dehydrated, dried and calcined and; an alkoxide process in which alcoholate of aluminum and silicon are admixed, hydrolyzed with addition of water, hydrated, dried and calcined. Other known processes are spray-pyrolysis and hydrothermal synthesis. The non-crystalline product obtained is calcined at 1,250°–1,400° C. thereby producing a mullite having a mean crystalline particle size of 10 nm. The purity, particle size, particle size distribution and crystalline structure of a given mullite vary with the starting material and process employed and are influential upon moldability, sintering and product quality.

It has been believed that mullites being oxide-type ceramics undergo only appreciable deterioration by oxides in the air and have high temperature strength, hopefully leading to successful application for automotive engine and gas turbine component parts. This was however hindered by their relatively low tenacity and weak mechanical strength as a structural material.

In order to eliminate the above drawbacks of mullite products, it has been proposed amongst other studies to suppress the formation of a glass phase, or to further enhance the purity of mullite per se. As for an example, there is known a process in which kaolin with low silica/alumina contents is formed and calcined at a temperature above 1,600° C., followed by evaluation of the glass phase in hydrogen fluoride.

The conventional processes are however somewhat complex and not fully immune to impurities contributory to glass phase formation.

It has therefore been considered important to find ways to preclude entry of alkali metal oxides and other detrimental impurities into the mullite system so as to eliminate glass phase formation and to allow calcination at a relatively low temperature thereby obtaining highest possible purity products.

SUMMARY OF THE INVENTION

With the foregoing drawbacks and problems of the prior art in view, the present invention seeks to provide a process for the production of high purity mullites which are highly resistant to heat in their application as various structural materials.

It has now been found that high purity mullite products having greatly improved high temperature performance can be produced by a relatively simple process in which a mixture comprising a specific class of aluminum and silica sources is reacted in a specific type of solvent with the resultant reaction product subjected to calcination at a relatively low temperature.

Briefly stated, the process of the present invention involves reacting a mixture of aluminum alkoxide and silicon alkoxide with an atomic ratio (weight) of Al/Si in the range of 2:1 to 7:1 in an aromatic hydrocarbon solvent at a temperature of 200°–350° C. and calcining the resulting reaction product at a temperature above 900° C.

The invention and advantages thereof will be better understood from the following detailed description.

DETAILED DESCRIPTION OF THE INVENTION

The aluminum alkoxide (aluminic ester) which forms one part of the starting mixture is defined by the general formula $Al(OR)_3$ wherein R is an alkyl group of preferably less than 6 carbon atoms such as for example aluminum isopropoxide, aluminum ethoxide and aluminum-t-butoxide. Most preferred is aluminum isopropoxide.

The silicon alkoxide which forms another part of the mixture is defined by the general formula $Si(OR)_4$ wherein R is an alkyl group of preferably less than 6 carbon atoms such as ortho-methylsilicate and ortho-ethylsilicate. Most preferred is ortho-ethylsiticate.

Aluminum alkoxide and silicon alkoxide are mixed at an Al/Si atomic ratio (weight) of 2:1to 7:1 preferably 2.5:1 to 6.5:1 and more preferably 2.5:1 to 6.5:1. Al/Si atomic ratios less than 2:1 would result in excess silica during reaction growing into glass phase or cristobalite which tends to crystallize upon calcination. Conversely, more than 7:1 atomic ratios would lead to increased alumina content and hence less pure mullite product.

The aromatic hydrocarbon solvent used in the invention includes benzene, toluene, xylene, beta-methylstyrene and beta-methylnaphthalene, of which toluene is particularly preferred. Two or more of these solvents may be blended. The amount of the solvent used is in the range of 1–100 times, preferably 5–30 times the total weight of both alkoxides.

The procedure to be followed in the production of the inventive mullites will now be described.

Aluminum and silicon alkoxides at a predetermined ratio are admixed in the solvent. Aluminum alkoxide however need not always be dissolved in the solvent but may be subjected in its suspension form to reaction. The admixture is introduced into a hermetically sealed reactor such as an autoclave and heated at a temperature above its boiling point, in which instance the autoclave should be purged with nitrogen or other inert gases to ensure that the solvent is not oxidized. Heat treatment is carried out preferably with stirring. The reaction is effected at a temperature of 200°–350° C., preferably 250°–300° C. and for a time period of 1–10 hours though dependent upon the reaction temperature. Reaction temperature lower than 200° C. would make it difficult to effect liquid-phase pyrolysis of aluminum alkoxide in the solvent, whereas reaction temperature higher than 350° C. would lead to decomposition of the solvent and increased reaction pressure.

The reaction product obtained is collected by decantation or filtration and washed, if required, with acetone or other organic solvents. The product is a nearly colorless gel.

The reaction product is thereafter calcined in the atmosphere at above 900° C., preferably at 1,000°–1,600° C. Calcination temperatures below 900° C. would fail in the crystallization of mullite, while calcination temperatures exceeding 1,600° C. would not affect the end use as a heat-resistant structural material but would lead to reduced surface area of the product when used as a combustion catalyst support. The reaction product, prior to calcination, may be dried in the air at room temperature and further dried at 200°–500° C. in the air.

The process of the invention is relatively simple compared to the prior art processes and is completely free from the attack of alkali metal oxides which would otherwise induce glass phase formation in the product. The mullite product obtained can maintain desirably high surface areas such as of 40m$^2$/g or greater after calcination at temperatures higher than 1,000° C., even at 1,300° C. Thus, the mullite product of the invention may find wide application as a high temperature service structural material for component parts of automotive engines, gas turbines, thermal treatment apparatus, material strength testing instruments and the like and further as a high temperature combustion catalyst support used in boilers, aero-jet engines, gas turbines for automobiles and electric generators and the like.

The invention will be further described by way of the following examples which however should not be construed as limitting the invention thereto,

INVENTION EXAMPLE 1

A mixture (Al/Si atomic ratio=3) of 12.5 grams (61.2 m mol) of aluminum isopropoxide and 4.2 grams (20.4 m mol) of ortho-ethylsilicate was suspended in 130 ml of toluene and fed into an autoclave of 300 ml. After purging the autoclave with nitrogen, the mixture was subjected to reaction by heating at 300° C. for 2 hours. The reaction product was filtered, washed with acetone and air-dried, followed by calcination at the three different temperatures indicated in Table 1 for a period of 30 minutes as the mixture was exposed to an air current flowing at 500 cc/min., in which instance the temperature was raised at a rate of 3° C./min. up to the respective calcining temperatures, thereby producing Sample A.

The above reaction product, upon air-drying, was also heated at temperatures ranging from room temperature to 1,550° C. by means of an air current of 100 ml/min. with a temperature increase rate of 10° C./min. The resulting product was measured by differential thermal analysis to show a crystallization temperature of mullite at 980° C. There was found no peak around 1,300° C. attributable to glass phase formation.

INVENTIVE EXAMPLE 2

The procedure of Inventive Example 1 was followed except that there was used a mixture (Al/Si atomic ratio=5) of 12.5 grams (61.2 m mol) of aluminum isopropoxide and 2.51 grams (12.2 m mol) of ortho-ethylsilicate, thereby producing Sample B.

The reaction product was subjected to differential thermal analysis also under the same conditions as in Inventive Example 1, to indicate a mullite crystallization temperature at 980°. No peak at around 1,300° C. attributable to glass phase was detected,

INVENTIVE EXAMPLE 3

The procedure of Inventive Example 1 was followed in preparing Sample C, except for the use of a mixture (Al/Si atomic ratio=6) of 12.5 grams (61.2 m mol) of aluminum isopropoxide and 4.1 grams (10.2 m mol) of ortho-ethylsilicate. Differential thermal analysis of the reaction product under the same conditions as in Inventive Example 1 showed a mullite crystallization temperature of 980° C. with no peak at about 1,300° C. attributable to glass phase formation.

COMPARATIVE EXAMPLE 1

The procedure of Inventive Example 1 was followed in preparing Sample D, except for the use of a mixture (Al/Si atomic ratio=0.5) of 12.5 grams (61.2 m mol) of aluminum isopropoxide and 25.1 grams (122.4 m mol) of ortho-ethylsilicate. The procedure of Inventive Example 1 was also followed in subjecting the reaction product to differential thermal analysis which indicated a mullite crystallization temperature of 980° C. A peak attributable to glass phase formation was detected at about 1,300° C.

COMPARATIVE EXAMPLE 2

The procedure of Inventive Example 1 was followed in preparing Sample E, except for the use of a starting material (Al/Si atomic ratio=∞) of 12.5 grams (61.2 m mol) of aluminum isopropoxide without addition of ortho-ethylsilicate.

Differential thermal analysis as per Inventive Example 1 was made of the reaction product, indicating the absence of a peak attributable to mullite crystallization.

Table 1 below is provided to illustrate the main physical property values of each of the Samples obtained in the foregoing examples. The surface area of each sample was measured by flow adsorption method in which the amount of nitrogen adsorbed was measured, after drying the sample at 200° C., at a liquid nitrogen temperature and at a relative pressure of 0.3. The value of adsorbed nitrogen thus measured was used on B.E.T. method to derive the surface area of each mullite product. X-ray diffraction patterns were obtained by Cu-Kα rays.

TABLE 1

| Example | Sample | Al/Si atomic ratio | Surface area (m²/g) calcination temperature (°C.) | | | X-ray diffraction pattern calcination temperature 1330° C. |
| --- | --- | --- | --- | --- | --- | --- |
| | | | 1000 | 1300 | 1500 | |
| Inventive Example 1 | A | 3 | 91 | 41 | 21 | M |
| Inventive Example 2 | B | 5 | 98 | 47 | 25 | M |
| Inventive Example 3 | C | 6 | 99 | 53 | 26 | M |
| Comparative Example 1 | D | 0.5 | 51 | 13 | 7 | θ, M |
| Comparative Example 2 | E | ∞ | 76 | 9 | 3 | α |

Note:
X-ray diffraction pattern M: mullite ($3Al_2O_3 \cdot 2SiO_2$)
X-ray diffraction pattern θ: θ-alumina ($Al_2O_3$)
X-ray diffraction pattern α: α-alumina ($Al_2O_3$)

What is claimed is:

1. A process for the production of high purity mullites which comprises reacting an aluminum alkoxide with a silicon alkoxide in an Al/Si atomic ratio of 2:1 to 7:1 in an aromatic hydrocarbon solvent in a hermetically sealed reactor at a temperature of 200° C.–350° C. and calcining the resulting reaction product at a temperature of 900° C.–1600° C.

2. A process according to claim 1 wherein said aluminum alkoxide is selected from the group consisting of aluminum isopropoxide, aluminum ethoxide and aluminum.t-butoxide.

3. A process according to claim 1 wherein said silicon alkoxide is selected from the group of ortho-methylsilicate and ortho-ethylsilicate.

4. A process according to claim 1 wherein said aromatic hydrocarbon solvent is selected from the group of benzene, toluene, xylene beta-methylstyrene and beta-methylnaphthalene.

* * * * *